US012709112B2

(12) United States Patent
Lysinger

(10) Patent No.: US 12,709,112 B2
(45) Date of Patent: Aug. 18, 2026

(54) METAL CANVAS PANEL

(71) Applicant: Matthew Jacob Lysinger, Dumfries, VA (US)

(72) Inventor: Matthew Jacob Lysinger, Dumfries, VA (US)

( * ) Notice: Subject to any disclaimer, the term of this patent is extended or adjusted under 35 U.S.C. 154(b) by 11 days.

(21) Appl. No.: 18/677,728

(22) Filed: May 29, 2024

(65) Prior Publication Data

US 2024/0399786 A1 Dec. 5, 2024

Related U.S. Application Data

(60) Provisional application No. 63/505,842, filed on Jun. 2, 2023.

(51) Int. Cl.

| | |
|---|---|
| ***B44D 3/18*** | (2006.01) |
| ***A47G 1/06*** | (2006.01) |
| ***G09F 7/18*** | (2006.01) |

(52) U.S. Cl.

CPC ........... *B44D 3/185* (2013.01); *A47G 1/0638* (2013.01); *G09F 7/18* (2013.01); *A47G 2001/0661* (2013.01)

(58) Field of Classification Search

CPC ........ B44D 3/185; B44D 3/18; A47G 1/0638; A47G 1/06; A47G 2001/0661; G09F 7/18

USPC ........ 40/124.04, 584, 600, 621, 661.01, 711, 40/594; 281/DIG. 1; 283/82

See application file for complete search history.

(56) References Cited

U.S. PATENT DOCUMENTS

| | | | |
|---|---|---|---|
| 2,621,142 | A | 12/1952 | Wetherell |
| 3,559,316 | A | 2/1971 | Galper |
| 3,856,611 | A | 12/1974 | Markley |
| 5,700,542 | A | 12/1997 | Pirchl |
| 8,959,812 | B2 | 2/2015 | Ridless |
| 9,358,830 | B1 | 6/2016 | McLaughlin |
| 9,462,898 | B1 | 10/2016 | Finnell |
| 9,668,595 | B2 | 6/2017 | Floyd |
| 9,861,215 | B2 | 1/2018 | Ridless |
| 11,094,231 | B2 | 8/2021 | Ruszczyc |
| 2013/0000169 | A1 | 1/2013 | Ramos-Gonzalez |

FOREIGN PATENT DOCUMENTS

WO WO-2022016083 A1 * 1/2022 ........... B42D 15/042

* cited by examiner

*Primary Examiner* — Justin V Lewis

(57) ABSTRACT

A decorative panel that may comprise of a magnetic, metal or alloy, support structure and a covering element made with supple materials. The support structure may include a front surface, a back surface, one or more sides, one or more truncated corners, one or more bend guidelines, a central area, and one or more bendable sections. The covering element may include an obverse surface, a rear surface, and one or more edges. The covering element may cover the front surface of the support structure and fold over the sides and onto the back surface of the support structure and may be mechanically fastened to the bendable sections with mechanical fasteners. The covering element may fold over the truncated corners and onto the back surface of the support structure. The bendable sections may be bent along the bend guidelines of the support structure. Other embodiments of a decorative panel are possible.

14 Claims, 12 Drawing Sheets

METAL CANVAS PANEL

BACKGROUND

The articles and methods described herein relate to wall décor and more specifically to canvas panels.

Canvas panels are used to create and display art. However, there are problems with existing canvas panels. Accordingly, a need exists for an improved canvas panel.

SUMMARY

An aspect of the present disclosure is a decorative panel that may comprise of a support structure and a covering element. The support structure may comprise of one or more sheets of magnetic, metal or alloy, material. The support structure may include a front surface, a back surface, one or more sides, one or more truncated corners, and one or more bend guidelines. Bend guidelines are rules that locate where the support structure may be bent and may separate the support structure into a central area and one or more bendable sections where the central area represents the intended shape of the decorative panel. The covering element may include an obverse surface, a rear surface, and one or more edges. The covering element may comprise of one or more sheets of supple material (such as textiles, papers, vinyl, or the like) which in some embodiments may be prepared (such as with a primer or the like) to accept art (such as art applied using a coloring medium or the like) or in other embodiments may have art already applied (such as by painting, printing, drawing, or the like) or in some other embodiments may be prepared and have art already applied. The covering element may cover the central area on the front surface of the support structure and may be folded over one or more sides of the support structure and onto the back surface of the support structure. The covering element may be mechanically fastened to one or more bendable sections of the support structure with one or more mechanical fasteners such as, but not limited to, staples, rivets, grommets, nails, screws, bolts, anchors, or the like, or any combination thereof. The covering element may be folded over one or more truncated corners of the support structure and onto the back surface of the support structure and in some embodiments the folded portion may be fastened to the support structure. One or more bendable sections may be bent along one or more bend guidelines.

A decorative panel of the present disclosure may resist warping due to humidity and is rigid with strong and secure corners that resist loosening. The risk of the covering element delaminating from the support structure or any art on the covering element being discolored, due to adhesive, is eliminated. When a bendable section, that has the covering element mechanically fastened to it, is bent along a bend guideline tension may be applied to the covering element which may reduce sagging and wrinkling and may result in the decorative panel having finished rounded sides. The covering element may cover one or more sides of the support structure, one or more truncated corners of the support structure, or both which may improve the appearance of the decorative panel, may prevent injury while handling the decorative panel, and may reduce the need to deburr or clean up the sides and truncated corners of the support structure saving time and money. Further, the decorative panel may be hung on a wall by directly attaching it to one or more fastening elements (such as magnets, hooks, cleats, or the like) without any modifications to the decorative panel which may eliminate the need for special adhesives, tools, hardware, and skill. The edges and folded portions of the covering element may be hidden from view when hung on a wall.

DETAILED DESCRIPTION

Figure 1:
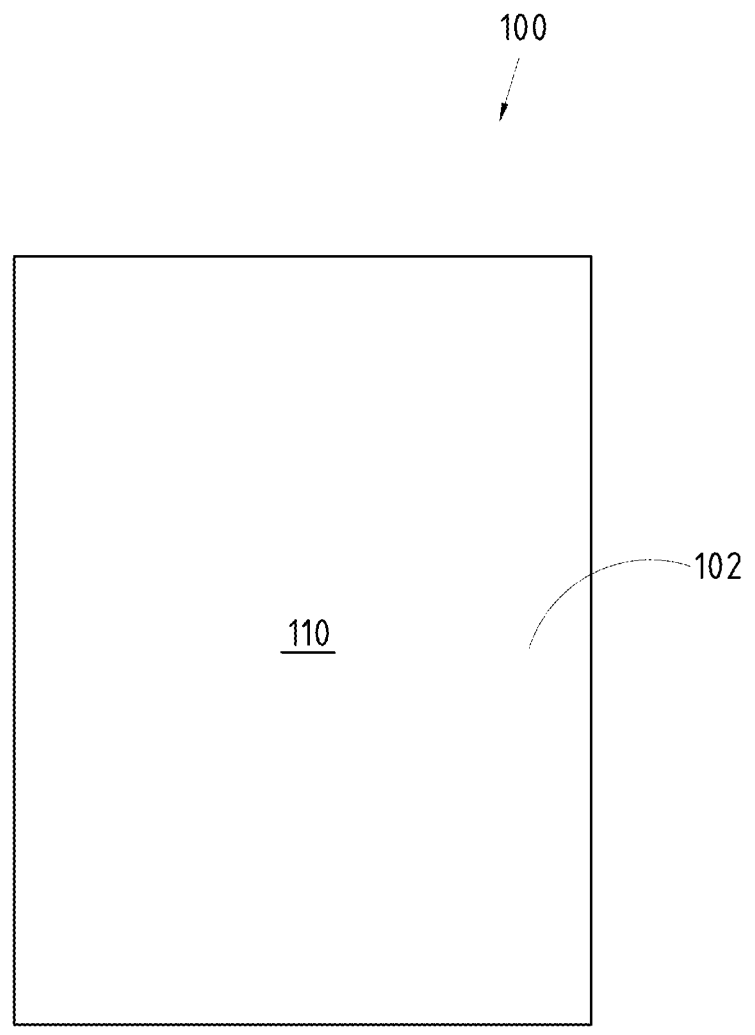
FIG. 1 is a plan view of an embodiment of a decorative panel.
Figure 2:
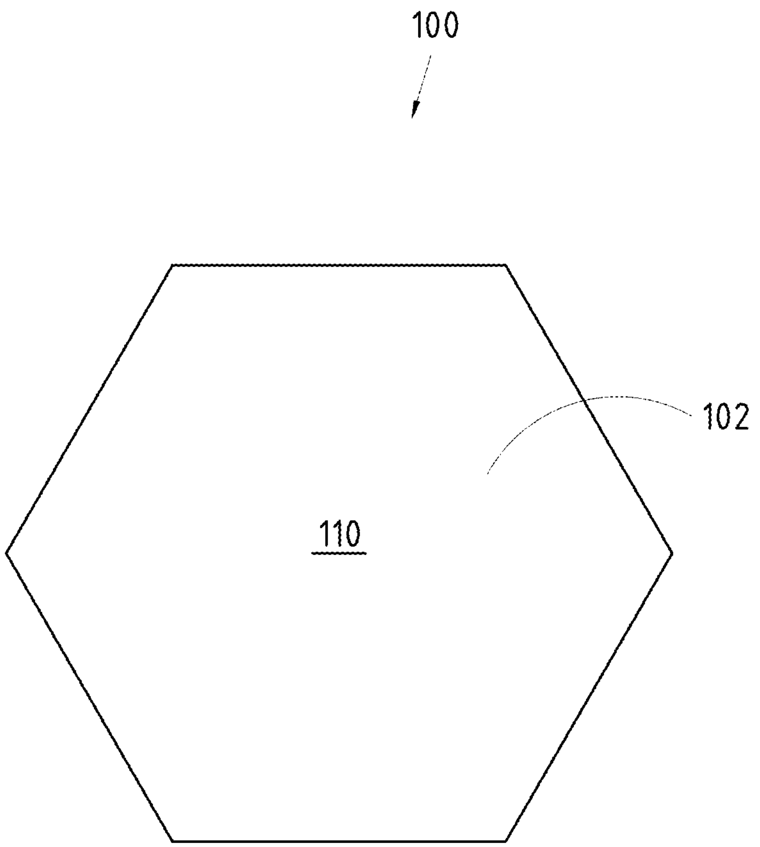
FIG. 2 is a plan view of another embodiment of a decorative panel.
Figure 3:
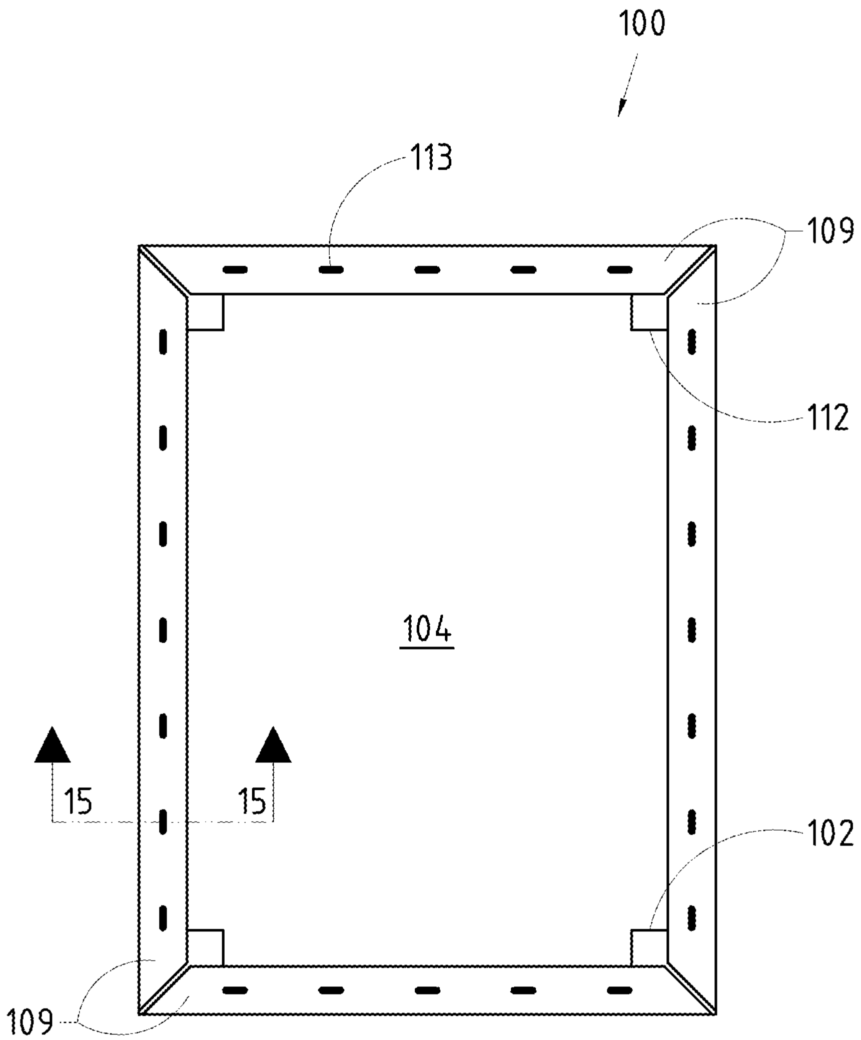
FIG. 3 is a rear plan view of the decorative panel shown in FIG. 1.
Figure 4:
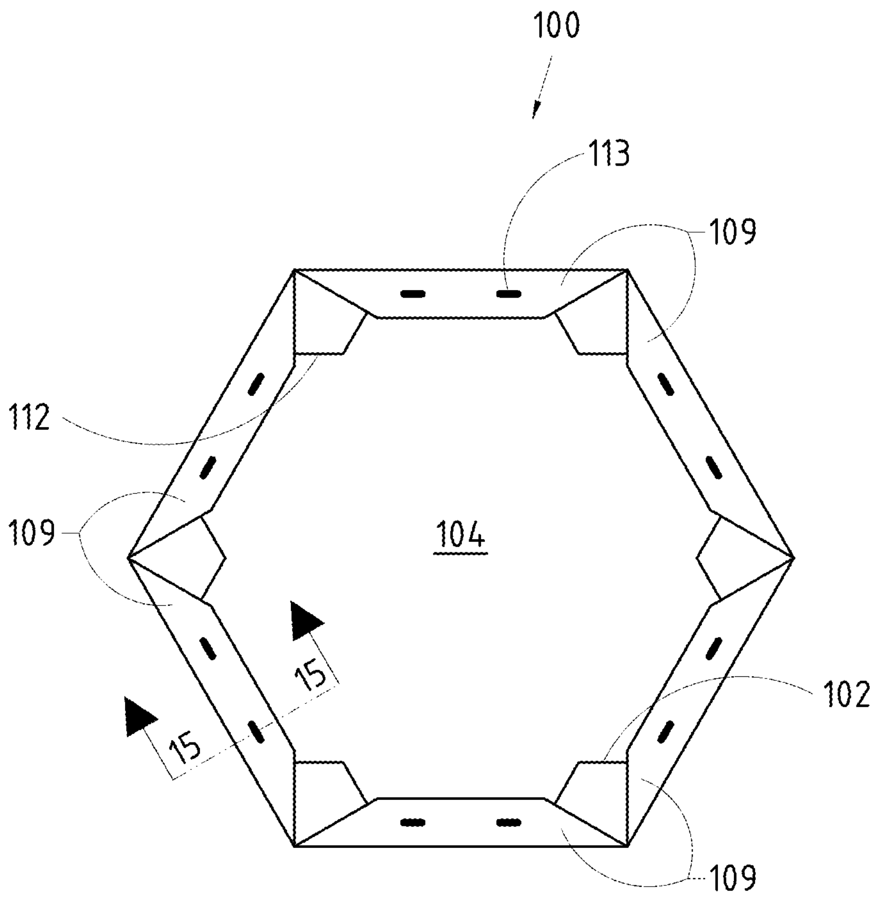
FIG. 4 is a rear plan view of the decorative panel shown in FIG. 2.
Figure 5:
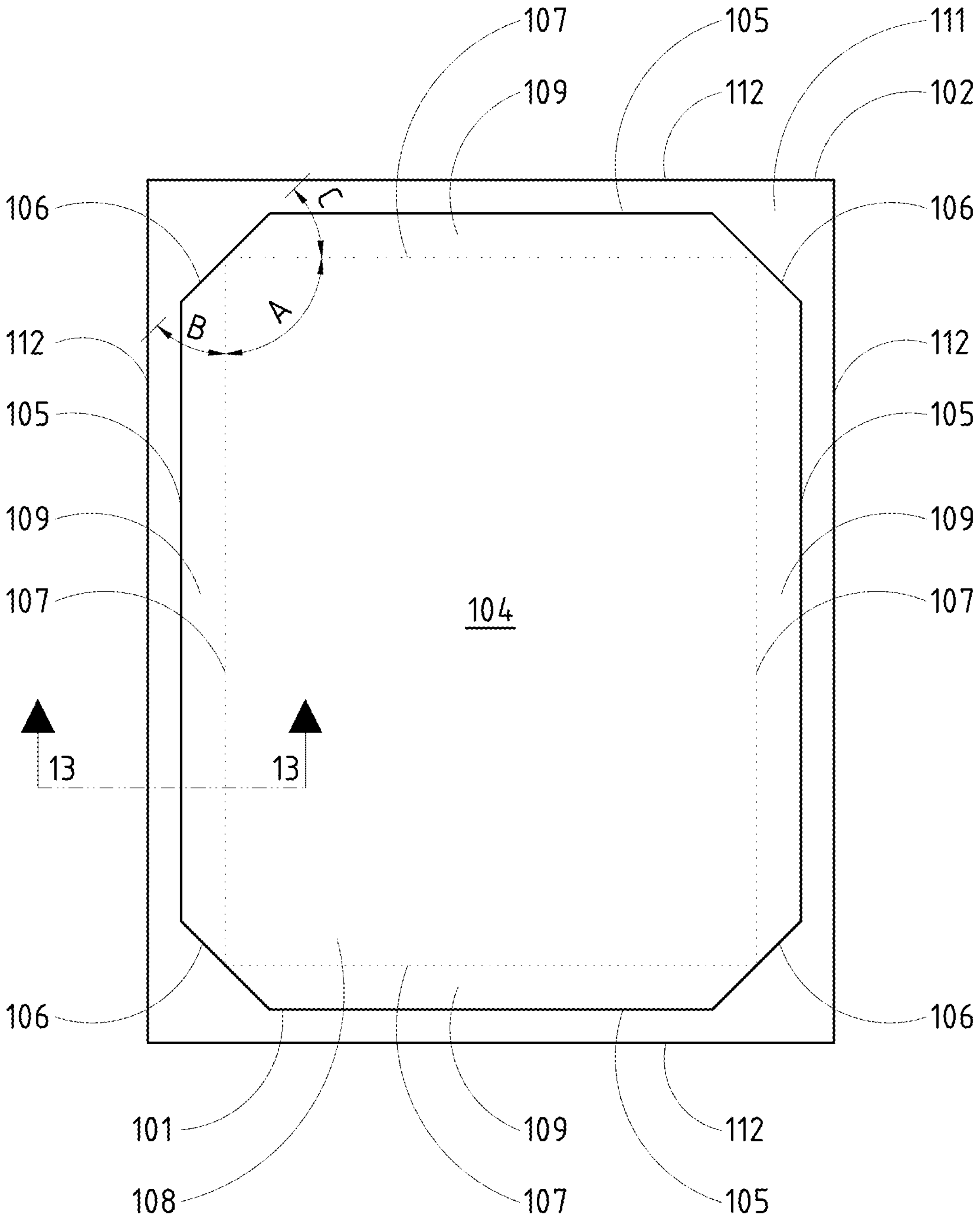
FIG. 5 is a rear plan view of a support structure and covering element that may be used to create a decorative panel as shown in FIGS. 1 & 3.
Figure 6:
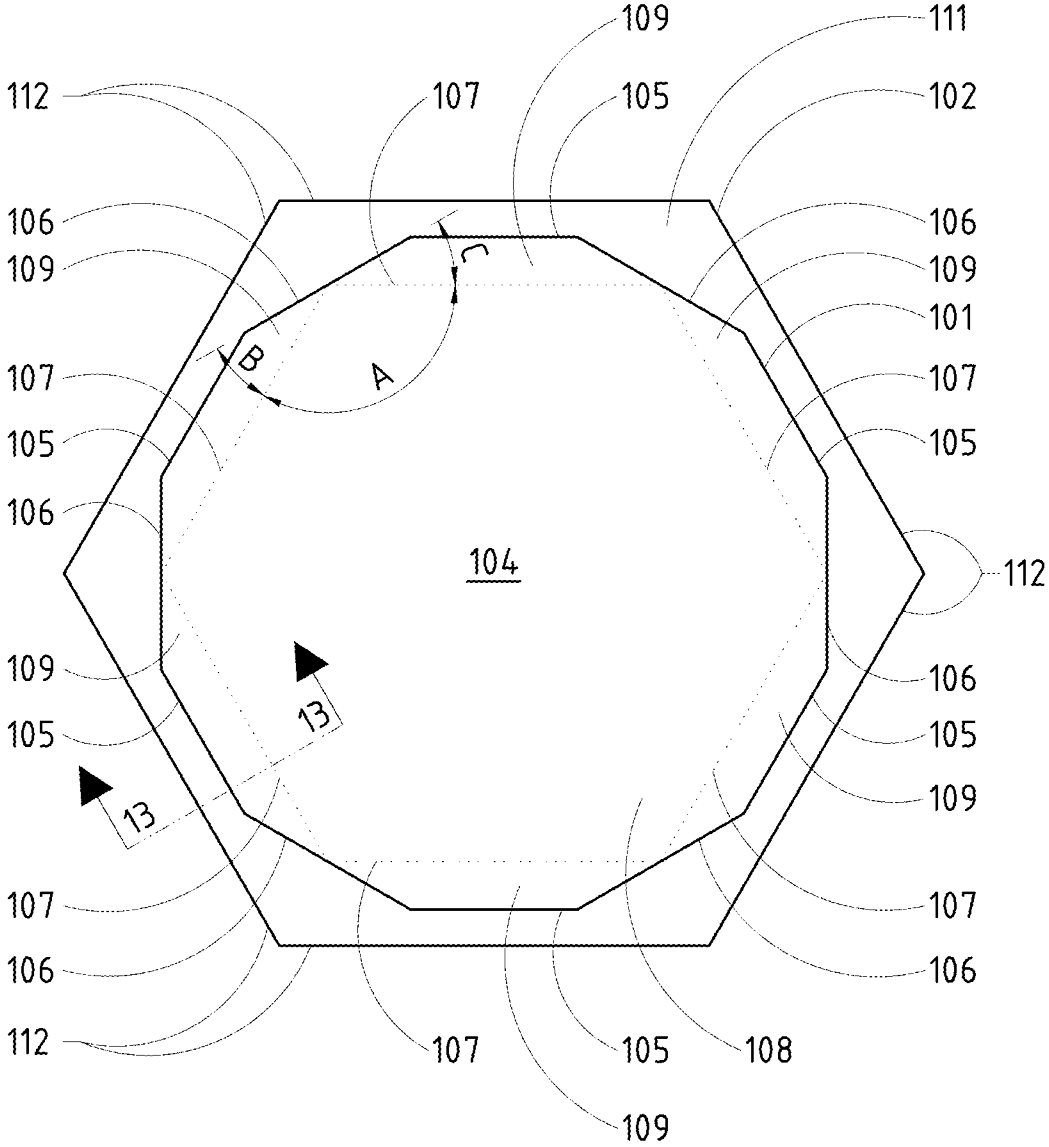
FIG. 6 is a rear plan view of a support structure and covering element that may be used to create a decorative panel as shown in FIGS. 2 & 4.
Figure 7:
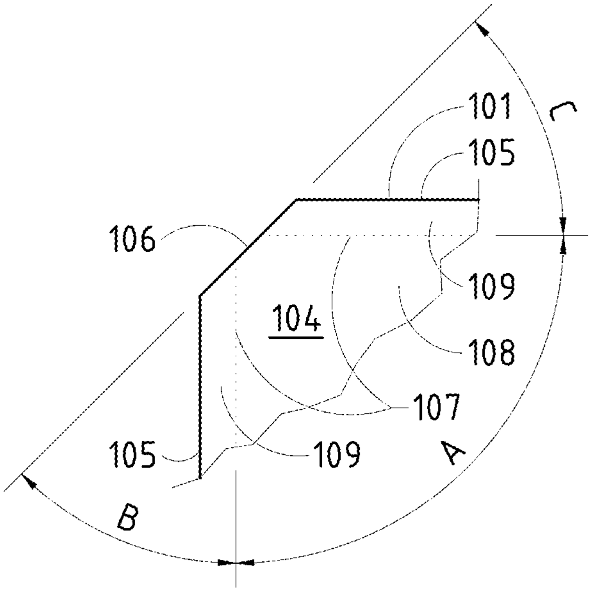
FIG. 7 is a detailed view of an embodiment of a truncated corner.
Figure 8:
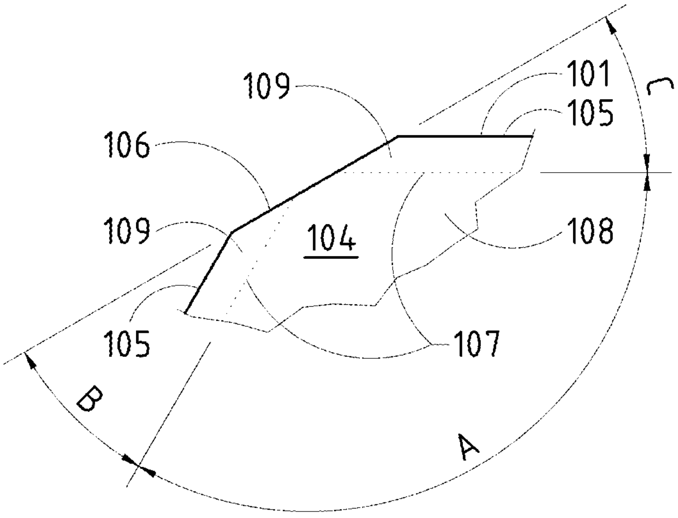
FIG. 8 is a detailed view of another embodiment of a truncated corner.
Figure 13:
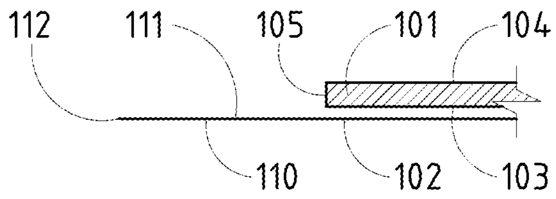
FIG. 13 is a partial section view of the support structure and covering element as shown in FIG. 5-6.

Embodiments of a decorative panel 100 are shown in FIG. 1-4. A decorative panel 100 starts out as individual articles, as shown in FIG. 5-6, where a covering element 102 is laid over the front surface 103 of a support structure 101 and where the rear surface 111 of the covering element 102 is facing the front surface 103 of the support structure 101 and the obverse surface 110 of the covering element 102 is facing away from the front surface 103 of the support structure 101 as shown in FIG. 13. A support structure 101 may have one or more sides 105 and one or more truncated corners 106. The layout of bend guidelines 107 may separate the support structure 101 into a central area 108 and one or more bendable sections 109. A covering element 102 may have at least one edge 112.

In some embodiments one or more bend guidelines 107 may be at least partially marked, or at least partially scored, or both at least partially marked and at least partially scored onto the support structure 101, or the covering element 102, or both the support structure 101 and the covering element 102. In some embodiments one or more bendable sections 109 may further include one or more bend guidelines 107 subdividing the bendable section 109 into multiple bendable sections 109. A truncated corner 106 is defined when a side 105 of the support structure 101 touches or intersects at least two adjacent bend guidelines 107 and when the angle between any two said adjacent bend guidelines 107, shown as angle A, is less than 180 degrees. When a truncated corner 106 is defined it ceases to be defined as a side 105 as described in this present disclosure. In the preferred embodiment each truncated corner 106 touches or intersects two adjacent bend guidelines 107 where the angle between a bend guideline 107 and the truncated corner 106, shown as angles B and C, equals to one half of the result of angle A subtracted from 180. In some embodiments the sum of angles B and C is equal to or less than angle A.

Figure 9:
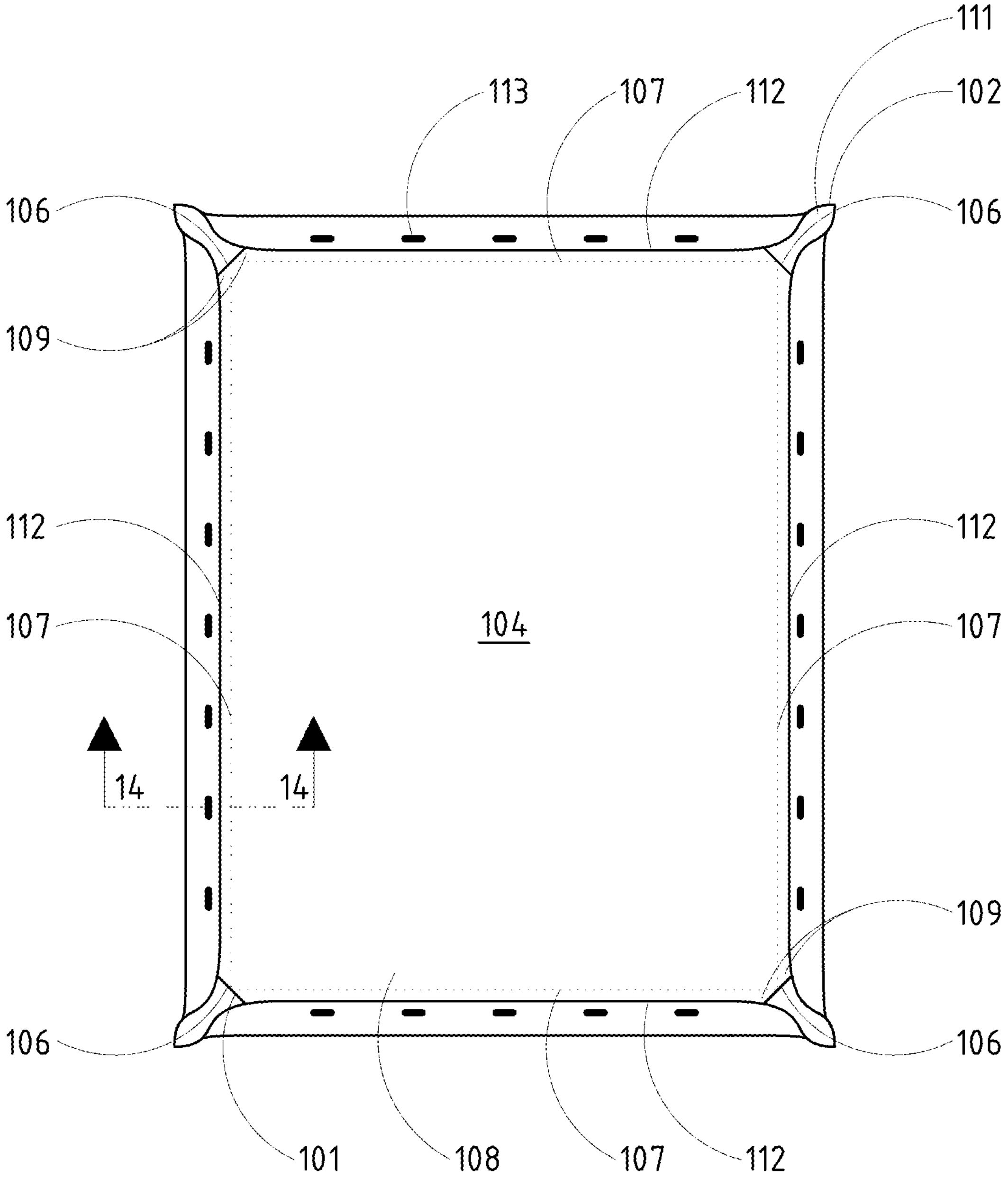
FIG. 9 is a similar view to FIG. 5 but with the covering element folded over the sides of the support structure and onto the back surface of the support structure and mechanically fastened to the bendable sections of the support structure.
Figure 10:
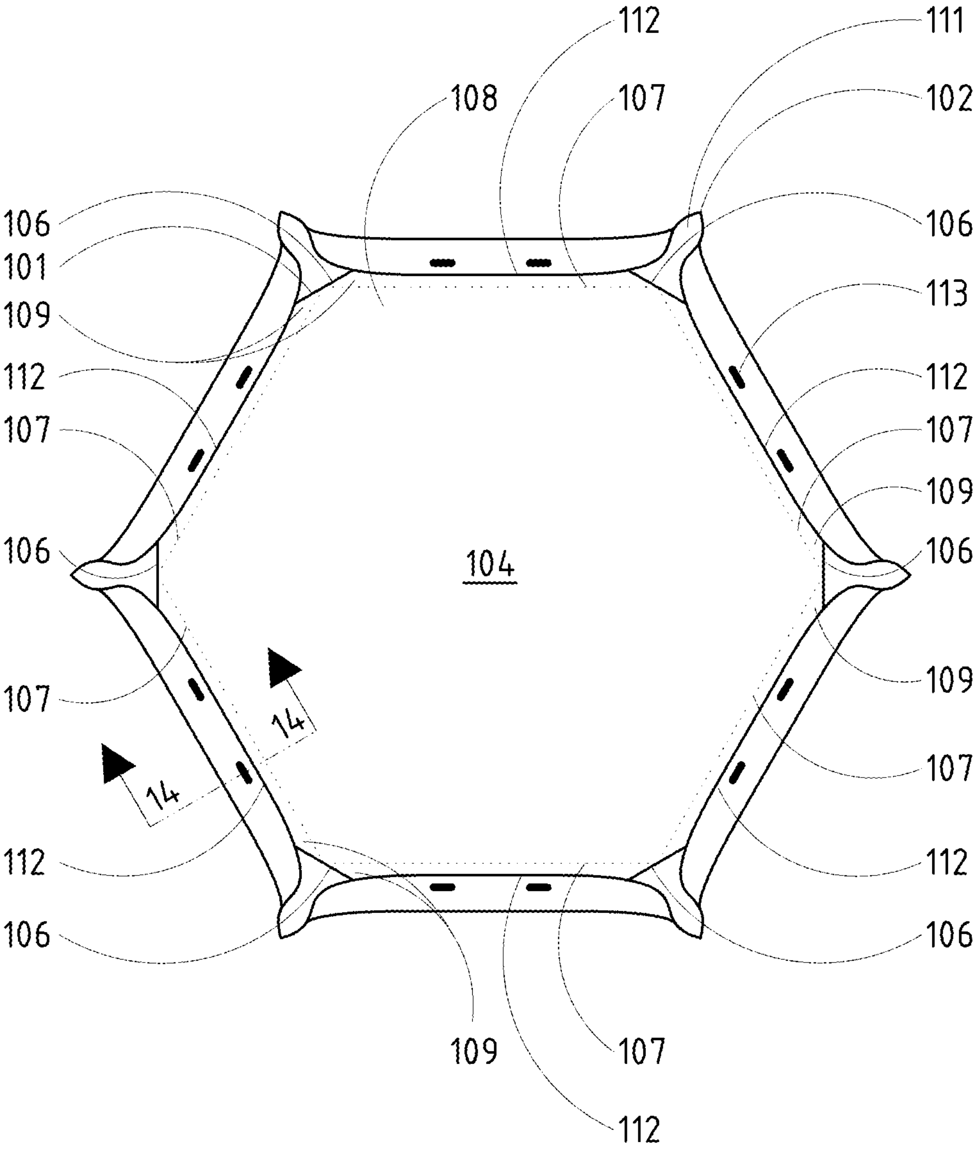
FIG. 10 is a similar view to FIG. 6 but with the covering element folded over the sides of the support structure and onto the back surface of the support structure and mechanically fastened to the bendable sections of the support structure.
Figure 14:
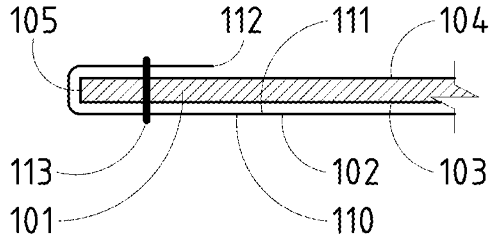
FIG. 14 is a partial section view of the support structure and covering element at a mechanical fastener as shown in FIG. 9-12.
Figure 15:
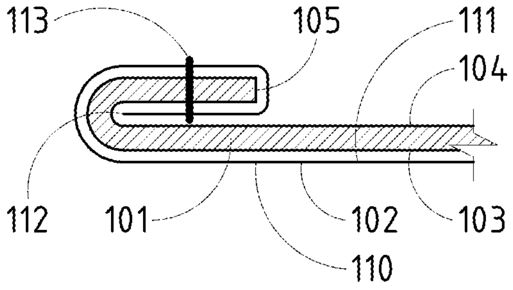
FIG. 15 is a partial section view of a decorative panel at a mechanical fastener as shown in FIG. 3-4.

The covering element 102 may cover the central area 108 on the front surface 103 of the support structure 101 and may be folded over one or more sides 105 of the support structure 101 and onto the back surface 104 of the support structure 101 with the covering element 102 extending along the back surface 104 of the support structure 101 at least far enough so the covering element 102 may be mechanically fastened to one or more bendable sections 109 of the support structure 101 with one or more mechanical fasteners 113 that intersect the covering element 102 on both the front surface 103 and back surface 104 of the support structure 101 as shown in FIGS. 9-10 & 14. In another embodiment the covering element 102 may cover the central area 108 on the front surface 103 of the support structure 101 and may extend along the front surface 103 of the support structure 101 at least far enough so the covering element 102 may be mechanically fastened to one or more bendable sections 109 of the support structure 101 with one or more mechanical fasteners 113 that intersect the covering element 102 on the front surface 103 of the support structure 101. While the covering element 102 may be any shape, in the preferred embodiment a closed shape that is created when the start and end point of every bend guideline 107 that borders the central area 108, where said start or end point does not already share a vertex with another bend guideline 107 that borders the central area 108, is extended or trimmed to a bend guideline 107 that borders the central area 108 in order to form a closed shape, is a closed shape the covering element 102 may match before being fastened to the support structure 101.

Figure 11:
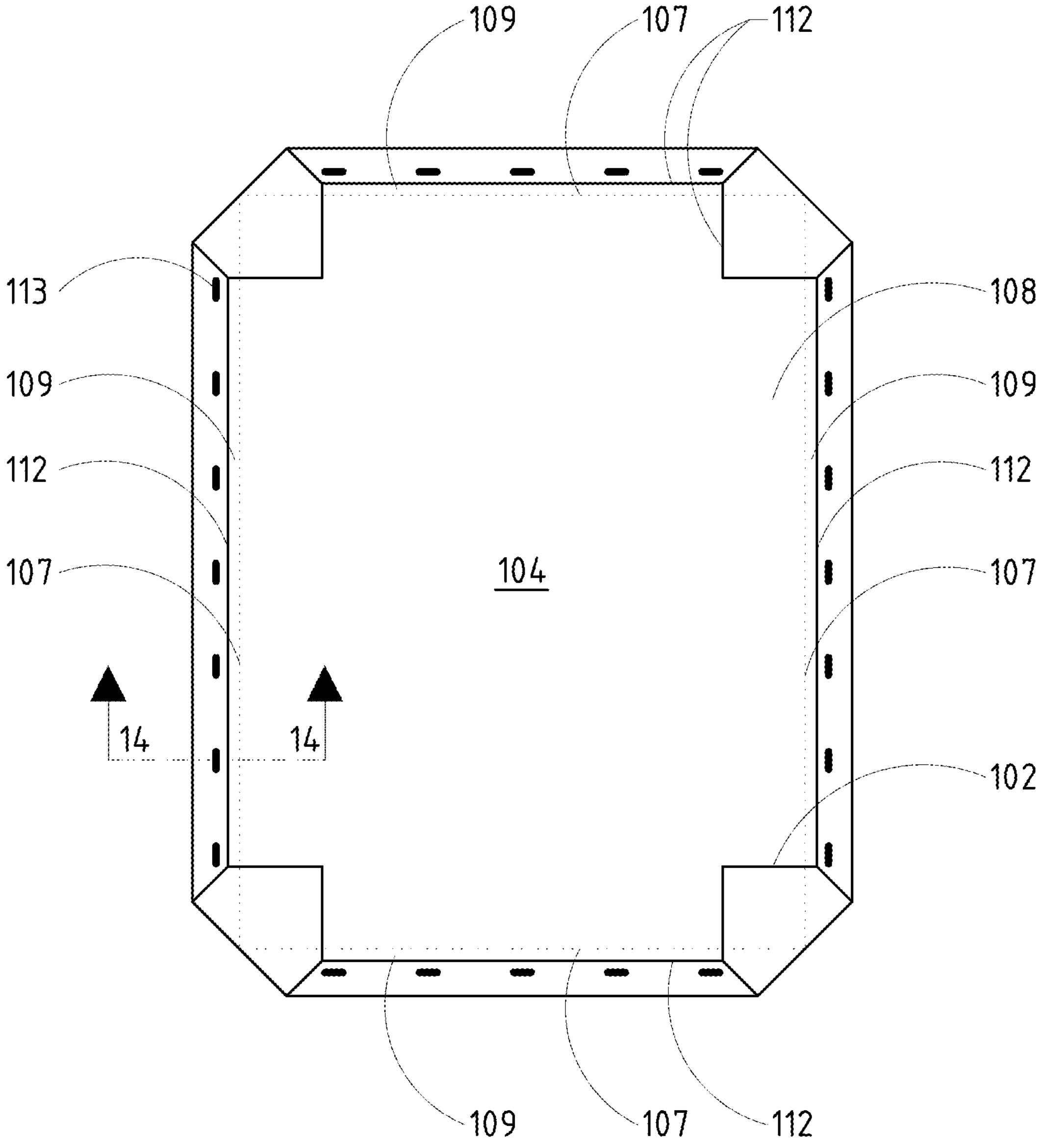
FIG. 11 is a similar view to FIG. 9 but with the covering element folded over the truncated corners of the support structure and onto the back surface of the support structure.
Figure 12:
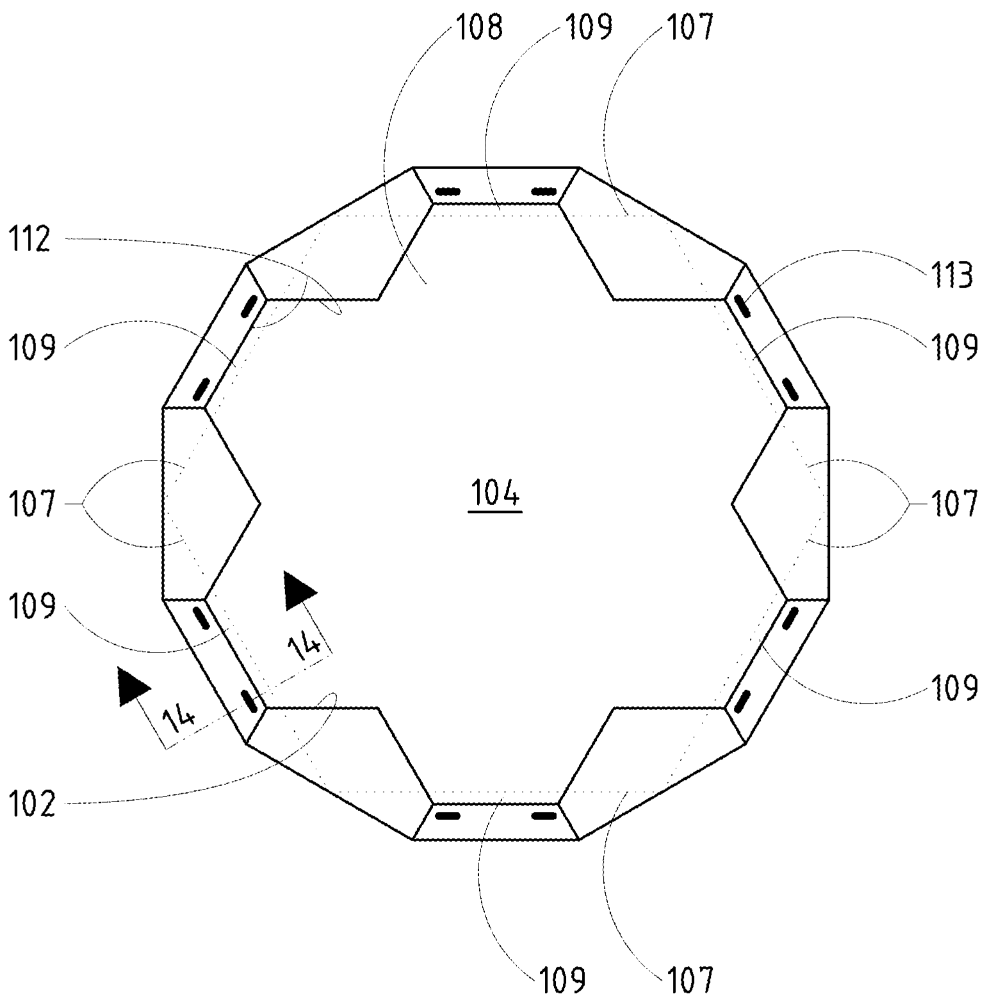
FIG. 12 is a similar view to FIG. 10 but with the covering element folded over the truncated corners of the support structure and onto the back surface of the support structure.

The covering element 102 may be folded over one or more truncated corners 106 of the support structure 101 and onto the back surface 104 of the support structure 101 as shown In FIG. 11-12. In some embodiments the portion of the covering element 102 that is folded over a truncated corner 106 of the support structure 101 and onto the back surface 104 of the support structure 101 may be fastened to the support structure 101 using, but not limited to, adhesive, or one or more adhesive coated materials (such as double-sided tape, double-sided adhesive foam, or the like), or any combination thereof. To form a decorative panel 100 at least one bendable section 109 that has the covering element 102 mechanically fastened to it, as exampled in FIG. 11-12, needs to be bent along at least one bend guideline 107 towards the back surface 104 of the support structure 101. In the preferred embodiment each bendable section 109 that has the covering element 102 mechanically fastened to it may be bent along the bend guidelines 107 towards the back surface 104 of the support structure 101.

What is claimed is:

1. A decorative panel, comprising:

a support structure and a covering element;

the support structure comprising at least one sheet of magnetic, metal or alloy, material and including a front surface, a back surface, at least one side, at least one truncated corner, and at least one bend guideline separating the support structure into a central area and at least one bendable section;

the covering element comprising at least one sheet of supple material and including an obverse surface, a rear surface, and at least one edge;

wherein the covering element covers the central area on the front surface of the support structure, and the covering element is mechanically fastened to at least one bendable section, and each bendable section that the covering element is mechanically fastened to includes at least one mechanical fastener, and a portion of the covering element is folded over the at least one truncated corner and onto the back surface of the support structure;

wherein the portion of the covering element that is folded over a truncated corner and onto the back surface of the support structure is fastened to the support structure using adhesive, or one or more adhesive coated materials, or both adhesive and one or more adhesive coated materials;

and wherein the at least one bendable section that has the covering element mechanically fastened to it is bent along at least one bend guideline toward the back surface of the support structure to define a decorative panel.

2. The decorative panel of claim 1, wherein the at least one bend guideline is at least partially marked, or at least partially scored, or both at least partially marked and at least partially scored on the support structure, or the covering element, or both the support structure and the covering element.

3. The decorative panel of claim 2, wherein the at least one bendable section further includes at least one bend guideline subdividing the bendable section into multiple bendable sections.

4. The decorative panel of claim 1, wherein the at least one bendable section further includes at least one bend guideline subdividing the bendable section into multiple bendable sections.

5. The decorative panel of claim 1, wherein the covering element has been prepared to accept art, or has art already applied, or has been prepared to accept art and has art already applied.

6. The decorative panel of claim 5, wherein the at least one bendable section further includes at least one bend guideline subdividing the bendable section into multiple bendable sections.

7. The decorative panel of claim 6, or claim 6, wherein the at least one bend guideline is at least partially marked, or at least partially scored, or both at least partially marked and at least partially scored on the support structure, or the covering element, or both the support structure and the covering element.

8. A decorative panel, comprising:

a support structure and a covering element;

the support structure comprising at least one sheet of magnetic, metal or alloy, material and including a front surface, a back surface, at least one side, at least one truncated corner, and at least one bend guideline separating the support structure into a central area and at least one bendable section;

the covering element comprising at least one sheet of supple material and including an obverse surface, a rear surface, and at least one edge;

wherein the covering element covers the central area on the front surface of the support structure, and the covering element is folded over at least one side of the support structure and onto the back surface of the support structure, and the covering element is mechanically fastened to at least one bendable section, and each bendable section that the covering element is mechanically fastened to includes at least one mechanical fastener that intersects the covering element on both the front surface and back surface of the support structure, and a portion of the covering element is folded over at least one truncated corner and onto the back surface of the support structure;

wherein the portion of the covering element that is folded over a truncated corner and onto the back surface of the support structure is fastened to the support structure using adhesive, or one or more adhesive coated materials, or both adhesive and one or more adhesive coated materials;

and wherein the at least one bendable section that has the covering element mechanically fastened to it is bent along at least one bend guideline toward the back surface of the support structure to define a decorative panel.

9. The decorative panel of claim 8, wherein the at least one bend guideline is at least partially marked, or at least partially scored, or both at least partially marked and at least partially scored on the support structure, or the covering element, or both the support structure and the covering element.

10. The decorative panel of claim 9, wherein the at least one bendable section further includes at least one bend guideline subdividing the bendable section into multiple bendable sections.

11. The decorative panel of claim 8, wherein the at least one bendable section further includes at least one bend guideline subdividing the bendable section into multiple bendable sections.

12. The decorative panel of claim 8, wherein the covering element has been prepared to accept art, or has art already applied, or has been prepared to accept art and has art already applied.

13. The decorative panel of claim 12, wherein the at least one bendable section further includes at least one bend guideline subdividing the bendable section into multiple bendable sections.

14. The decorative panel of claim 12, or claim 13, wherein the at least one bend guideline is at least partially marked, or at least partially scored, or both at least partially marked and at least partially scored on the support structure, or the covering element, or both the support structure and the covering element.

* * * * *